| United States Patent [19] | [11] | 4,401,682 |
|---|---|---|
| Battista | [45] | Aug. 30, 1983 |

[54] EXPANDABLE LOW CALORIE COMPOSITIONS

[76] Inventor: Orlando A. Battista, 5280 Trail Lake Dr., Fort Worth, Tex. 76133

[21] Appl. No.: 256,022

[22] Filed: Jul. 31, 1981

[51] Int. Cl.³ .............................. A23J 3/00; A23L 1/34
[52] U.S. Cl. .................................... 426/285; 426/656; 426/657; 426/658; 426/454; 426/804
[58] Field of Search ............... 426/648, 656, 657, 661, 426/454, 285, 804, 658

[56] References Cited

U.S. PATENT DOCUMENTS

| 2,269,665 | 1/1962 | Herbst | 426/648 X |
|---|---|---|---|
| 3,023,104 | 2/1962 | Battista | 426/804 X |
| 3,385,715 | 5/1968 | Ishler et al. | 426/454 X |
| 3,574,634 | 4/1971 | Singer | 426/804 X |
| 4,039,695 | 8/1977 | Johnson | 426/454 X |
| 4,237,170 | 12/1980 | Satin | 426/21 |
| 4,315,954 | 2/1982 | Kuipers et al. | 426/804 X |

*Primary Examiner*—Robert A. Yoncoskie

[57] ABSTRACT

There is disclosed compositions comprising primarily mixtures of edible cellulose fibers and/or colloidal cellulose microfibrils, incorporated with low-molecular animal and/or vegetable proteins, crosslinked with edible non-covalent and/or covalent crosslinking agents. The compositions possess a water-expandable property such as to grow in volume in an aqueous acidic medium and serve as a firm gelatinous binder for the edible components. The above mixture is compressed in dry powder forms into tablets and/or granular compositions capable of swelling at the acid pH of the stomach into a firm gelatinous physical mass or masses that effectively serve to provide a temporary reduction of the appetite by mechanical rather than systemic action.

9 Claims, No Drawings

EXPANDABLE LOW CALORIE COMPOSITIONS

BACKGROUND OF THE INVENTION

This invention relates to new weight-control compositions comprising mixtures of edible cellulose fibers and/or colloidal cellulose microfibrils, incorporated with low-molecular animal and/or vegetable proteins, crosslinked with edible non-covalent and/or covalent crosslinking agents, to provide compositions possessing a water-expandable property such as to grow at least to several times their dry volume in an aqueous acidic medium. The above mixture is compressed in dry powder forms into tablets and/or granular compositions capable of swelling at the acid pH of the stomach into a firm gelatinous physical mass or masses that effectively serve to provide a temporary reduction of the appetite by mechanical rather than systemic action.

The medical literature provides abundant evidence that the excessive intake of food and overweight constitutes a series health problem. Calorie intake above an individual's needs as a result of the excessive consumption of foods damage the heart and the circulatory system, particularly in the case of aged persons, pregnant women, and people suffering from diabetes. Recently, the use of appetite-reducing medicaments has become widespread. However, such drugs act as stimulants of the central nervous system and, therefore, the continuous administration thereof leads to series damages of the central nervous system and also to habituation. The side effects of such systemic drugs to control weight have become so series in recent time that they have come under FDA control. Amphetamines, for example, can no longer be used for weight control except by prescription under a physican's control; they have been removed for over-the-counter sales.

Recently a number of attempts have been made to solve this problem by the administration of compositions containing indigestible substances. The use of these compositions leads to the feeling of fullness without causing weight increase. The following additives have been suggested: casein (British Pat. No. 990,523), mixtures of egg-albumin, casein, cellulose-ether, guar gum, agar pectin, carrageen, and sodium alginate (British Pat. No. 993,308), guar gum (British Pat. Nos. 1,041,600 and 1,106,882), a mixture of soluble polyglucose citrate and insoluble polyglucose (British Pat. No. 1,182,961), microcrystalline cellulose (U.S. Pat. No. 3,023,104), a mixture of 50% of glutin flour, 1–10% of vegetable gums, and 50% of microcrystalline cellulose, peanut-shell, or wood-flour (U.S. Pat. No. 3,023,104), edible cheese (DAS No. 1,442,021), and 5–30% of finely dispersed pure cellulose (DAS No. 1,959,196). Special dry cakes for diabetic people have also been described, prepared from 100% of soya flour and 30–50% of protein (DAS No. 2,060,797). None of the above products meets in a satisfactory manner the requirements of pleasant and permanent consumption, good taste, and easy absorption from the intestinal tract.

Many efforts have been made to use conventional fibrous cellulose as a bulking agent in low calorie food compositions and in pharmaceuticals. Fibrous cellulose has the advantage, in addition to providing desirable dietary fiber, of providing desired bulk without calories. However, a principal defect of this material has been its objectionable texture. This characteristic has greatly limited the use of fibrous cellulose both in the field of food technology and the field of pharmaceutical preparations. When fibrous cellulose has been mixed according to conventional methods with other food ingredients, the fibrous cellulose is usually very noticeable to the taste, is not smooth, has a fibrous or gritty feel to the tongue and mouth when chewed, and tends to accumulate as an insoluble or residual material in the mouth. As a result, the food compositions themselves have tended to be rendered unpalatable by the addition of fibrous cellulose. Reduction of the fibrous cellulose content of such compositions to the point where it is not detectable when chewed has effectively reduced the proportion of fibrous cellulose to the point where it has no longer been effective as a bulking agent or a source of significant dietary fiber.

U.S. Pat. No. 4,042,719 disperses fibrous carbohydrates in a solution of cellulose ethers, subsequently drying the gelled mixture up to temperatures as high as 300° C. to increase palatability by masking the fibrous taste of the fibrous carbohydrate.

SUMMARY OF THE INVENTION

According to the present invention there is provided a process for the preparation of a composition having a very low caloric value, which comprises dry mixing natural digestible carbohydrates and a highly foamed, low molecular weight protein such as gelatin prior to converting the dry mixture into tablets, capsules, or granular forms. In no instance, and unlike the prior art, are the ingredients dispersed in a gel solution prior to drying.

According to an embodiment of the process of the present invention the carbohydrate components on the one hand and the protein components on the other are admixed in a finely divided dry state, optionally in the presence of further minor components such as flavorings and/or coloring.

The main feature of the present invention is that no significant swelling of the compressed carbohydrate components and protein components occur until the components reach the stomach, and the component most responsible for the swelling of the tablet is the acidic gastric juices.

One commercially available source of particulate fibrous celluloses satisfactory for use in compressed diet-aid invention is obtained from the Brown Company of Berlin, N.H. under the trade name SOLKA-FLOC. Satisfactory food grades of this particulate fibrous cellulose, also known as powdered cellulose, are grades SW-40 and BW-300. These are mechanically disintegrated and purified celluloses generally obtained from primarily alpha cellulose derived from wood pulp. Ninety-nine and five-tenths percent of this material will pass through a 33-micron screen and 99.0% will pass through a 23-micron screen. The average fiber length is 21 microns and the average fiber width is 17 microns. Such relatively fine powdered celluloses, or an equivalent finely powdered cellulose, provide cellulose fibers which may be used as one bulking ingredient in producing our low calorie, edible carbohydrate/protein diet-aid tablets or capsules.

The second key carbohydrate ingredient of this invention is microcrylstalline cellulose, commercially known as AVICEL and produced by the acid hydrolysis of alpha cellulose. These ultrapure forms of colloidal powdered celluloses are available from FMC Corporation of Philadelphia, Pa. as grades PH101 and PH105.

The protein component of this invention comprises a product made from a highly aerated form of natural animal protein (such as gelatin) or natural vegetable protein (such as soybean protein) with or without edible crosslinking agents. The aqueous protein gels are dried down in their aerated form to less than 10% moisture, preferably to less than 7% moisture, and then are comminuted into ultrafine particulate form. Typical protein compositions suitable for use in this invention are described in U.S. Pat. No. 4,264,493 issued Apr. 28, 1981.

Prior to blending and compressing into tablets, granules, or "plugs" for insertion into capsules, the combined proportions of edible cellulose including dry fibrous alpha cellulose and dry microcrystalline cellulose may range from 10–50% by weight and the amount of finely divided aerated natural protein may range from 50–10% by weight. The optimum compression varies with each formulation and generally ranges from 1000 psi to 7500 psi.

EXAMPLE 1

To a 20% solution of a natural edible gelatin (bloom 300, pH 4.4) at 40° C., about 1.66% by weight of ammonium alum is added with stirring. This mixture is then aerated in a high speed mixer such as a Waring Blendor while it is cooled. The resulting solid gel is cut into approximately one-eighth inch cubes and dried to at least 10% moisture, preferably below 7% moisture. The dried cubes of foamed gelatin are ground to approximately 50–70 micron particles.

Fifty grams of the above finely divided gelatin, 35 grams of SOLKA-FLOC SW-40, and 15 grams of AVICEL Microcrystalline Cellulose (PH 101) are dry blended to produce a uniformly mixed tableting powder. This mixture is fed to a standard tableting machine and compressed at 2000 psi into 0.5 gram tablets.

When these tablets are added to simulated gastric juice at a pH of about 2, they grow progressively to a swollen mass ranging from 6 to 15 times their original volume.

EXAMPLE 2

To a 30% solution of natural edible gelatin (bloom 225 at a pH 4.5) at 40° C. about 1.66% by weight of ammonium alum with stirring is added, this addition being made using a 10% aqueous solution of ammonium alum.

This mixture is then aerated in a high speed mixer such as a Waring Blendor or Osterizer and cooled in trays as a sheet while its temperature cools to room temperature (25° C.). The resulting solid gel is cut into approximately one-eighth inch cubes and subsequently dried to at least 10% moisture, preferably below 7%. The dried cubes of foamed gelatin are gound to approximately 50–70 micron particles.

Fifty grams of the above finely divided gelatin, 35 grams of SOLKA-FLOC SW-40, and 15 grams of AVICEL Microcrystalline Cellulose (PH 101 Grade) are dry-blended to produce a uniformly mixed tableting powder. This mixture is fed to a standard tableting machine and compressed at 2,500 psi into 0.5 gram tablets.

When tablets prepared in this way are added to simulated gastric juice at a pH of about 2, they grow progressively to a swollen mass from 10 to 20 times their original volume.

EXAMPLE 3

To a 40% dispersion of natural edible soybean protein at 60° C. and pH 8.0, about 2.0% of potassium alum is added, this addition being made using a 5% aqueous solution of potassium alum.

This protein mixtureis now treated with the procedure of Example 2, paragraphs 2 and 3.

Fifty grams of the above prepared finely divided foamed soybean protein, 30 grams of SOLKA-FLOC SW-40, and 20 grams of AVICEL Microcrystalline Cellulose (PH 105 Grade) are dry-blended to produce a uniformly mixed tableting powder. This mixture is fed to a standard tableting machine and compressed at 3,000 psi into 0.45 gram tablets.

Tablets prepared in this way, when added to simulated gastric juice at a pH of about 2, grow progressively into a very highly swollen mass from 5 to 15 times their original volume.

Various changes and modifications may be made in practicing this invention without departing from the spirit and scope thereof and, therefore, the invention is not to be limited except as defined at the appended claims.

I claim:

1. A method for the preparation of a low calorie edible product adapted to expand to a swollen gelatinous mass at least 3 times its original volume when ingested and comes into contact with the gastric juice of the stomach which comprises forming an aqueous solution of animal or vegetable protein, adding to the solution an edible crosslinking agent sufficient to cross-link said protein, aerating the solution subjected to crosslinking, cooling the aerated solution to form a gel, drying the gel to a moisture content of less than about 10%, comminuting the dried gel to form finely divided, particulate, aerated protein; dry blending the particulate, aerated protein with particulate edible cellulose, the particulate, aerated protein constituting from about 10 to 50%, by weight of the blend and compressing the blend into a shaped form.

2. The method as defined in claim 1 wherein the particulate edible cellulose constitutes 50%, by weight, of the blend and consists of 30 to 35%, by weight of the blend, of finely divided particulate, alpha cellulose and 20 to 15%, by weight of the blend, of microcrystalline cellulose.

3. The method as defined in claim 1 wherein the blend is compressed into a shaped form at a pressure of between about 1000 and 7500 psi.

4. As an article of manufacture, a low calorie edible compressed shaped form consisting essentially of from 10 to 50%, by weight, finely divided, particulate, aerated, cross-linked animal or vegetable protein containing less than 10% moisture and the balance particulate edible cellulose, the shaped form being further characterized in that when ingested and upon coming into contact with the gastric juice of the stomach expands into a swollen gelatinous mass at least 3 times its original volume.

5. An article of manufacture as defined in claim 4 wherein the protein is an animal protein.

6. An article of manufacture as defined in claim 4 wherein the protein is gelatin.

7. An article of manufacture as defined in claim 4 wherein the protein is soybean protein.

8. An article of manufacture as defined in claim 4 wherein the protein constitutes about 50%, by weight of the shaped form, and the particulate edible cellulose consists of 30 to 35%, by weight of the shaped form, of finely divided particulate alpha cellulose and the balance of the shaped form consists of microcrystalline cellulose.

9. An article of manufacture as defined in claim 4 wherein the protein is gelatin and constitutes 50%, by weight, of the shaped form and the particulate edible cellulose consists of 35%, by weight of the shaped form, of finely divided particulate alpha cellulose and of 15%, by weight of the shaped form, of microcrystalline cellulose.

* * * * *